United States Patent [19]
Domian et al.

[11] Patent Number: 5,795,265
[45] Date of Patent: Aug. 18, 1998

[54] PROCESS FOR CONTROLLING AN AUTOMATIC TRANSMISSION

[75] Inventors: Hans-Jörg Domian, Immenstaad; Ralf Dreibholz, Meckenbeuren; Gerd Frotscher; Thomas Schober, both of Friedrichshafen, all of Germany

[73] Assignee: ZF Friedrichshafen AG, Friedrichshafen, Germany

[21] Appl. No.: 776,001

[22] PCT Filed: Jul. 8, 1995

[86] PCT No.: PCT/EP95/02658

§ 371 Date: Jan. 10, 1997

§ 102(e) Date: Jan. 10, 1997

[87] PCT Pub. No.: WO96/01961

PCT Pub. Date: Jan. 25, 1996

[30] Foreign Application Priority Data

Apr. 12, 1994 [DE] Germany .......................... 44 24 456.8

[51] Int. Cl.⁶ .................................................. F16H 61/06
[52] U.S. Cl. ..................... 477/143; 477/149; 477/156
[58] Field of Search ................................. 477/143, 144, 477/149, 155, 156, 158

[56] References Cited

U.S. PATENT DOCUMENTS

| | | | |
|---|---|---|---|
| 5,070,747 | 12/1991 | Lentz et al. | 477/149 |
| 5,363,724 | 11/1994 | Asahara et al. | 477/156 X |
| 5,468,198 | 11/1995 | Holbrook et al. | 477/143 |
| 5,547,437 | 8/1996 | Kamada et al. | 477/155 X |
| 5,551,931 | 9/1996 | Matsumoto | 477/149 |
| 5,577,974 | 11/1996 | Bertsche et al. | 477/143 X |
| 5,580,332 | 12/1996 | Mitchell et al. | 477/143 |
| 5,596,495 | 1/1997 | Brown et al. | 477/144 X |
| 5,653,660 | 8/1997 | Tsukamoto et al. | 477/156 X |
| 5,674,154 | 10/1997 | Tsukamoto et al. | 477/143 X |
| 5,697,860 | 12/1997 | Shimei et al. | 477/143 X |
| 5,704,874 | 1/1998 | Shimada et al. | 477/154 |

FOREIGN PATENT DOCUMENTS

| | | |
|---|---|---|
| 0435378 | 7/1991 | European Pat. Off. |
| 0498481 | 8/1992 | European Pat. Off. |
| 0565111 | 10/1993 | European Pat. Off. |
| 94/12814 | 6/1994 | WIPO . |

*Primary Examiner*—Khoi Q. Ta
*Assistant Examiner*—Peter T. Kwon
*Attorney, Agent, or Firm*—Davis and Bujold

[57] ABSTRACT

A process is proposed for controlling an automatic transmission where changing from one gear speed to another is brought about as a result of a first clutch (11) opening and a second clutch (12) closing. It is further proposed to apply the process to a group transmission.

15 Claims, 5 Drawing Sheets

PROCESS FOR CONTROLLING AN AUTOMATIC TRANSMISSION

The invention relates to a process for controlling an automatic transmission.

BACKGROUND OF THE INVENTION

EP-OS O 435 374 has disclosed a process for controlling an automatic transmission wherein a change from a first to a second reduction ratio results by a first clutch disengaging and a second clutch engaging. With the beginning of the change the pressure of the first clutch is lowered, so that it does not slip. The curve of a turbine speed establishes the disengagement point of the first clutch. After reaching the disengagement point, the clutch slip of the second clutch is controlled in dependence on a time function. It cannot be understood, from the OS, how a load take over of the second clutch from the first clutch is carried out.

An automatic transmission in group design is known from EP-OS O 565 111. Both transmission parts contain planetary gear sets and free wheels. Within the gear sequence the first and second parts are engaged only once during an upshift from the second to the third gear. Here the shifting devices in the two transmission parts work in opposition, that is, in the first part an upshift is carried out and in the second part a downshift is carried out. It is disadvantageous that a group shifting of both transmission parts is carried out only during an upshift.

SUMMARY OF THE INVENTION

The problem to be solved by this invention is to provide a process for controlling an automatic transmission, which can be applied in particular, to a group transmission.

According to the invention, the problem is solved by the fact that in a first gearshift method the shifting operation consists of the phases rapid filling, filling equalization, load take-over, gradient setting, sliding, gradient breakdown and closure. In a second gearshift method, the shifting operation consists of the phases rapid filling, filling equalization, gradient setting, sliding, gradient breakdown, load take-over and closure. A first gearshift method according to the invention is to be understood as an upshift in pull load or a downshift in push load. The second gearshift method, according to the invention, is to be understood as a downshift in pull load or an upshift in push load.

The solution, according to the invention, offers the advantage that the process in question is a dynamic process. Dynamic means that during the shifting the selection and transition from the first to the second clutch result automatically and continuously whereby a steady curve of the output torque is obtained under all conditions of travel. In a desired performance, the driven presets an internal combustion engine via an accelerator pedal which enters immediately in the gearshift calculation or in determining the gearshift method. If the gearshift transition begins, for example, as downshift in pull load, then immediately after the driver has released the accelerator pedal the gearshift method is changed so as to terminate the gearshift as downshift in push load.

In one embodiment it is proposed that in the first gearshift method, during the rapid filling phase, the second clutch is loaded with high pressure and the pressure of the first clutch is lowered from a first to a second level, the second level being above the slip limit of the first clutch; in the filling equalization phase the second clutch is filled-to a lower pressure level pF and the pressure of the first clutch remains at the second level; in the load take-over phase the pressure of the second clutch is raised to a final value pE1=f (parameter 1) and the pressure of the first clutch is lowered from the second level to zero; in the gradient setting phase the pressure of the second clutch is raised from the final value pE1 to a final value pE2=f (parameter 2); in the sliding phase the pressure of the second clutch is linearly raised or a presynchronization point is detected therein; in the gradient breakdown phase the pressure of the second clutch is reduced to a final value pE3=f (parameter 3); the closure phase begins when the final value pE3 is reached.

In another embodiment, it is proposed that in the second gearshift method, during the rapid filling phase, the second clutch is loaded with high pressure and the pressure of the first clutch is lowered from a first to a second level, the second level being above the slip limit of the first clutch; in the filling equalization phase the second clutch is filled to a lower pressure level pF and the pressure of the first clutch remains at the second level; in the load take-over phase the pressure of the second clutch is raised to a final value pE1=f (parameter 1) and the pressure of the first clutch is lowered from the second level to zero; in the gradient setting phase the pressure of the second clutch is raised from the final value pE1 to a final value pE2=f (parameter 2); in the sliding phase the pressure of the second clutch is linearly raised until a presynchronization point is detected therein; in the gradient breakdown phase the pressure of the second clutch is reduced to a final value pE3=f (parameter 3); the closure phase begins when the final value pE3 is reached.

In another embodiment, it is proposed that in the second gearshift method, during the rapid filling phase, the second clutch is loaded with high pressure and the pressure of the first clutch is lowered from a first to a second level, the second level being above the slip limit of the first clutch; in the filling equalization phase the second clutch is filled to a lower pressure level pF and the pressure of the first clutch remains at the second level; in the gradient setting phase the pressure of the first clutch is reduced to a final value pE4=f (parameter 2); in the sliding phase the pressure of the first clutch is slopingly raised until a presynchronization point is detected therein; in the gradient breakdown phase the pressure of the first clutch is increased from the slope final value to a final value pE5=f (parameter 1); in the load take-over phase the pressure of the first clutch is reduced from the final value pE5 to zero and the pressure of the second clutch is raised from the pressure level pF to the final value pE5 and the closure phase begins when the final value pE5 is reached.

In one improvement on the two embodiments described above it has been proposed that the parameter 3 be established by a time interval for the transition from differential speed gradient at the presynchronization point to the differential speed gradient at the synchronization point, where the differential speed gradient and the differential speed at the synchronization point are zero. The advantage obtained here is that toward the end of the gearshift operation the previously built up differential speed gradient is again continuously reduced so that the transition to the synchronization point of the second reduction ratio develops without jolts. The synchronization point of the second clutch and the complete gradient breakdown here fall together from the point of view of time.

In another improvement, it is proposed that on the asis of the preceding sign of the sum of actual static and actual dynamic torques a push-pull difference results. The advantage obtained hereby is that, for example, in an upshift with slight throttle valve position and high speed step of the internal combustion engine, the influence of the internal combustion engine is also taken into account as energy storage.

To apply the process to a group transmission, it is further proposed according to the invention that the automatic transmission is simultaneously shifted in the first and second transmission parts, the shifting operations being carried out.

In an improvement hereon, it is proposed that the parameter 2 is calculated from a single sum of the actual static torque, a dynamic torque of the first transmission part, which results from a differential speed on the transmission input side, a nominal shifting time of the internal combustion engine and a first inertia coefficient, and a dynamic torque of the second transmission part, where the torque is calculated from the differential speed of the second transmission part, a nominal shifting time of the second transmission part and a second inertia coefficient.

In another development it is proposed that a push-pull difference result on the basis of the preceding sign of the sum of actual static and actual dynamic torques. The advantage obtained hereby is that, for example, in an upshift with slight throttle valve position and high speed step of the internal combustion engine, the influence of the internal combustion engine is also taken into account as energy storage.

To apply the process to a group transmission, it is further proposed according to the invention that the automatic transmission is simultaneously shifted in the first and second transmission parts, the shifting operations are carried out.

In an improvement hereon, it is proposed that the parameter 2 is calculated from a single sum of the actual status torque, a dynamic torque of the first transmission part, which results from a differential speed on the transmission input side, a nominal shifting time of the internal combustion engine and a first inertia coefficient, and a dynamic torque of the second transmission part, where the torque is calculated from the differential speed of the second transmission part, a nominal shifting time of the second transmission part and a second inertia coefficient.

In another development, it is proposed that with the detection of the presynchronization point in the second transmission part, the calculation of the parameter 2 goes over to the calculation of the parameter 2 according to claim 4 for the first transmission part.

DESCRIPTION OF THE PREFERRED EMBODIMENTS

Figure 1:
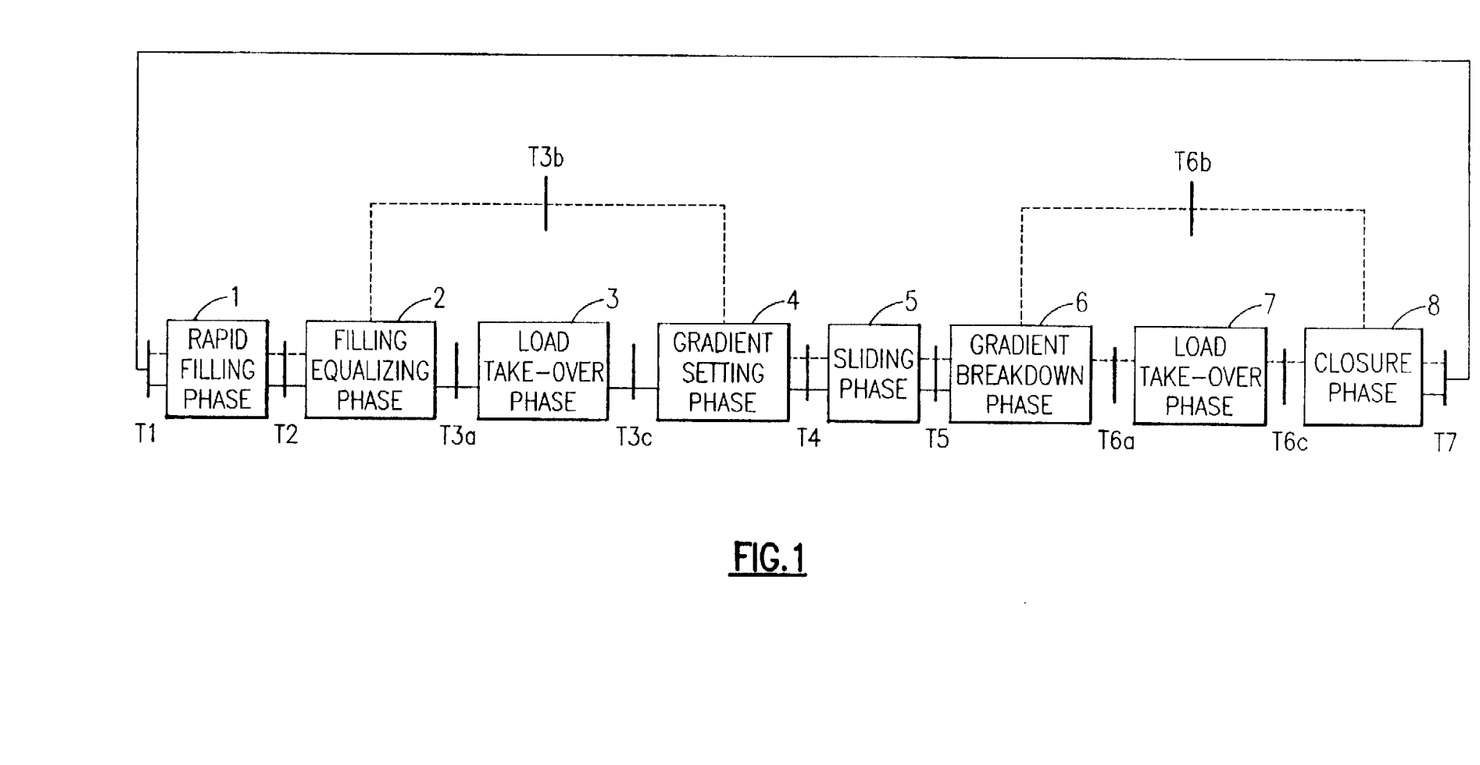
FIG. 1 is a phase diagram.

FIG. 1 shows a phase diagram consisting of rapid filling phase 1, filling equalizing phase 2, load take-over phase 3, gradient setting phase 4, sliding phase 5, gradient breakdown phase 6, load take-over phase 7 and closure phase 8. The traversing line here corresponds to the cycle of a gearshift of the first method. A gearshift of the first method is to be understood as an upshift in pull load or a downshift in push load. The dotted line corresponds to a cycle for a gearshift of the second method. A second gearshift method is to be understood as a downshift in pull load or an upshift in push load. According to the phase diagram a cycle is carried out for each of the two clutches taking part in the gearshift. The transition from one phase to the other depends on the occurrence of defined events or conditions hereinafter called transition.

For a gearshift of the first method, the following cycle results for the second clutch: transition T1, an electronic control device detects on the basis of input signals a need for shifting and issues a shifting command. The rapid filling phase 1 follows. During the rapid filling phase 1, the second clutch is loaded with high pressure, the rapid filling pressure. The T2 transition is checked as to whether a time interval which controls the duration of the rapid filling pressure has elapsed. Thereafter follows the filling equalizing phase 2. In the filling equalizing phase 2 the second clutch is filled with pressure medium. The second clutch still does not transmit torque. Transition T3 is checked as to whether a time interval which controls the duration of the filling equalization has elapsed. Then follows the load take-over phase 3. In the load take-over phase 3 the pressure in the second clutch is raised from the filling equalizing level to an end value pE1=f (parameter 1). The parameter 1 corresponds to a static torque which, in turn, corresponds to a function of the actual torque generated by the internal combustion engine multiplied by a converter torque ratio.

When using an automatic transmission without hydrodynamic converter, the static torque corresponds to the actual torque generated by the internal combustion engine. Transition T3 is accomplished when the torque on the second clutch corresponds to the static torque. Thereafter follows the gradient setting phase 4. In the gradient setting phase 4 the pressure of the second clutch is raised from final value pE1 to a final value pE2. The final value pE2 is a function of a parameter 2. Contained in the parameter 2 is a dynamic torque. The calculation of the parameter 2 is explained in relation to FIG. 4. Transition T4 is checked as to whether a time interval has elapsed. This is followed by the sliding phase 5. Transition T5 is checked as to whether a presynchronization point has been reached. The presynchronization point is determined from a differential speed gradient of the second clutch, the actual differential speed value of the second clutch and a time interval. Then follows the gradient breakdown phase 6. In the gradient breakdown phase the pressure is reduced to a final value pE3=f (parameter 3). The parameter 3 is established by a time interval for the transition from differential speed gradient at the presynchronization point to the differential speed gradient at the synchronization point. Where the differential speed gradient and the differential speed at the synchronization point of the second clutch are zero. During this phase the previously built up dynamic torque is again reduced. Transition T6$b$ is checked as to whether the pressure of the dynamic torque has been reduced or whether the synchronization speed has been reached. Then follows the closure phase 8. During the closure phase 8 the pressure on the second clutch is slopingly raised until the absolute value of the differential speed of the second clutch within a third time interval is less than a nominal value. If this condition has been met, the second clutch is loaded with main pressure. Transition T7 is checked as to whether an adherence of the second clutch has been detected. Then the phase diagram again begins at T1.

A gearshift of the second method consists of the phases rapid filling 11 filling equalizing 2, gradient setting 4, sliding 5, gradient breakdown 6, load take-over 7 and closure 8. The function blocks have already been described so a repeated description is omitted. Transitions T3$b$, T6$a$ and T6$c$ are supplementarily added. T3$b$ is checked for the first clutch as to whether a time interval for the filling equalization has elapsed. Transition T6a is checked for the first clutch whether the pressure from the dynamic torque has been reduced and in transition T6c whether a time interval has elapsed.

Figure 2A:
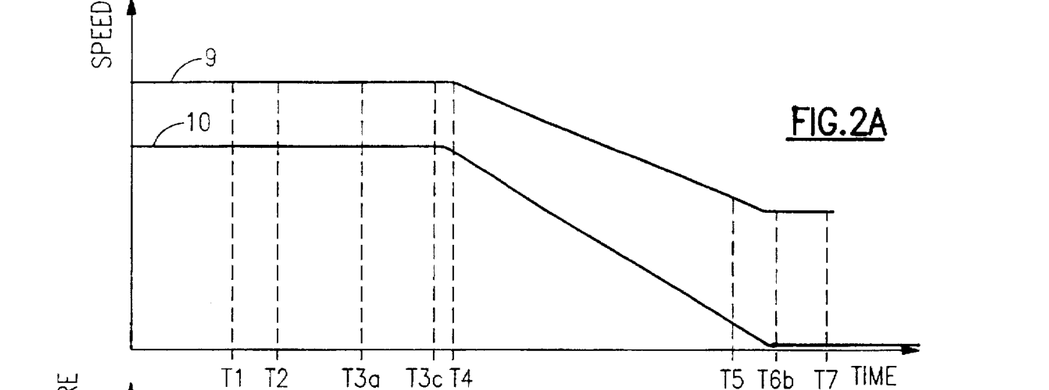
FIG. 2 is a time diagram of a gearshift of the first method.
Figure 2B:
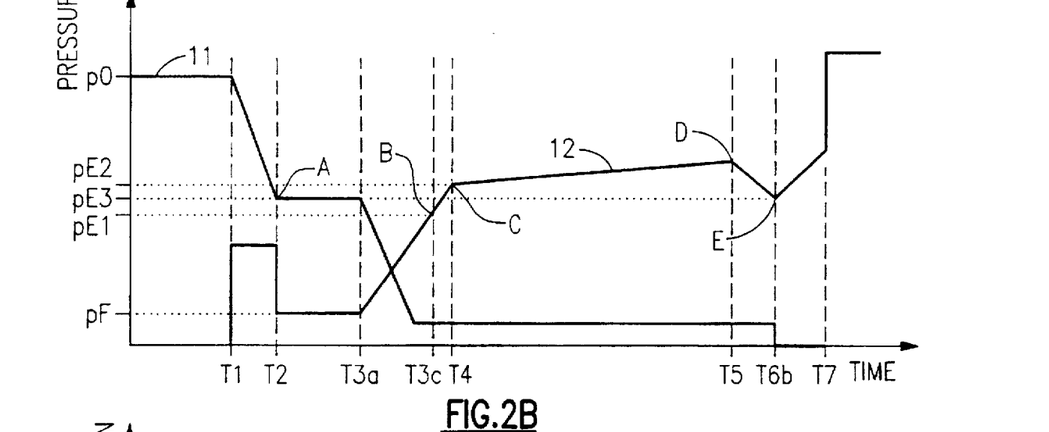
Figure 2C:
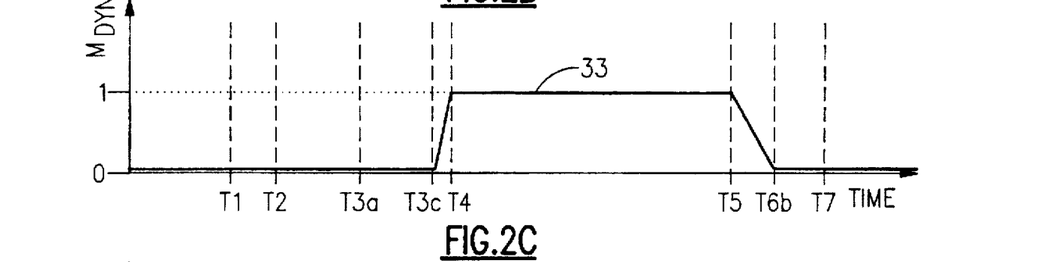
Figure 2D:
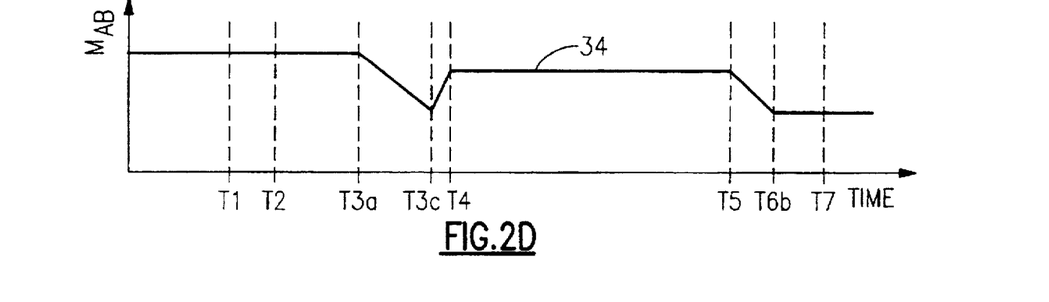

FIGS. 2A to 2D show a speed curve and a pressure curve for a gearshift of the first method and the appertaining curves of the dynamic torque 33 (FIG. 2C) and transmission output torque 34 (FIG. 2D). FIG. 2B shows a pressure curve in the course of time for the first clutch 11 and the second clutch 12. The speed curve of an internal combustion engine 9 resulting from said pressure curves and the differential speed curve 10 of the second clutch in the course of time are shown in FIG. 2A. The values of T shown on the abscissa correspond to the transitions of FIG. 1. In T1 an electronic control device issues the shifting command. The pressure of the first clutch 11 is simultaneously reduced from an initial value p0 to a pressure value of the point A. The pressure level of the point A is above the slip limit of the first clutch 11. In transition T1 the second clutch 12 is likewise loaded with high pressure, the rapid filling pressure. This corresponds to the rapid filling phase of FIG. 1. Transition T2, the time interval for the rapid filling phase has expired, for the second clutch 12 the filling equalizing phase begins until the transition T3a has been accomplished. During the filling equalizing phase, pressure level pF, the second clutch is filled with a pressure medium, still it transmits no torque. The pressure level of the first clutch remains constant during the filling equalizing phase of the second clutch. Transition T3 is checked as to whether a time interval for the filling equalization has expired. If this condition has been fulfilled, the load take-over phase begins for the second clutch 12. The load take-over phase terminates when the pressure in the second clutch 12 has reached the pressure level of the point B, pressure final value pE1. The pressure level of the point 5 is selected so that the second clutch can transmit a static torque. The static torque results from the torque actually generated by the internal combustion engine multiplied by a conversion ratio when a hydrodynamic torque converter operates in the automatic transmission. The torque actually generated by the internal combustion engine can be directly detected or, as known per se, calculated from a speed of the internal combustion engine and an injection period or position of a throttle valve. At the point B still no change of the speed of the internal combustion engine or differential speed of the second clutch appears. During the load take-over phase the pressure of the first clutch 11 is reduced from the pressure level of the point A to zero. Transition T3c is checked as to whether the torque of the second clutch 12 corresponds to the static torque. Thereafter the torque is increased up to a pressure level of the point C, pressure final value pE2. The pressure level of the point C is calculated with reference to a parameter 2. For the calculation of the parameter 2 reference is made to FIG. 4. The dynamic torque enters in the calculation of the parameter 2. The dynamic torque is a function of a nominal shifting time, an inertia coefficient referred to the transmission input side and a differential speed. The differential speed results from the ratio of the first and second ratios multiplied by the output speed of the transmission. The gradient of the speed of the internal combustion engine 9 and the gradient of the differential speed of the second clutch 10 are controlled by the pressure differential from point B to point C and the pressure final value pE1 to pE2. As it can be seen from FIG. 2C, the dynamic torque rises simultaneously from its initial value zero to the final value one, corresponding to 100%. In transition T4 the sliding phase begins for the second clutch until the transition T5. During the sliding phase the pressure of the second clutch rises linearly. During the sliding phase the load of the second clutch can be reduced by the torque generated by the internal combustion engine being reduced, for example, by means of ignition engagement or reduction of the injection quantity. Transition T5 is accomplished when a presynchronization point is detected. The latter is determined from a differential speed gradient of the second clutch, the actual differential speed value of the second clutch and a time interval. Delay times for the hydraulics, for example, can also be taken into consideration by the time interval. By using the differential speed gradients of the second clutch, there are also taken into consideration the cases in which a change is effected in the speed of the internal combustion engine from a higher level to a lower level. The differential speed gradient of the second clutch results from the speed difference of both clutch halves and the change thereof in the course of time. With direction of the presynchronization point, the pressure of the second clutch 12 in point D is reduced to a new pressure value of the point E, pressure value pE3. Due to the pressure reduction from point D to point E of the second clutch 12, the previously built up dynamic torque is again reduced. Hereby the gradient of the speed of the internal combustion engine 9 and the differential speed 10 of the second clutch change in a manner such that both transform in direction of a horizontal. In the practice this means a soft and joltless passage to the synchronization point of the second reduction ratio. Transition T6b is accomplished when the dynamic pressure breaks down or the synchronous speed of the second reduction ratio is reached. After the transition T6b begins the closure phase during which the pressure of the second clutch is slopingly raised until the absolute value of the differential speed of the second clutch within a third time interval is less than a nominal value. The clutch is then loaded with main pressure, since it is completely engage, transition T7.

Figure 3A:
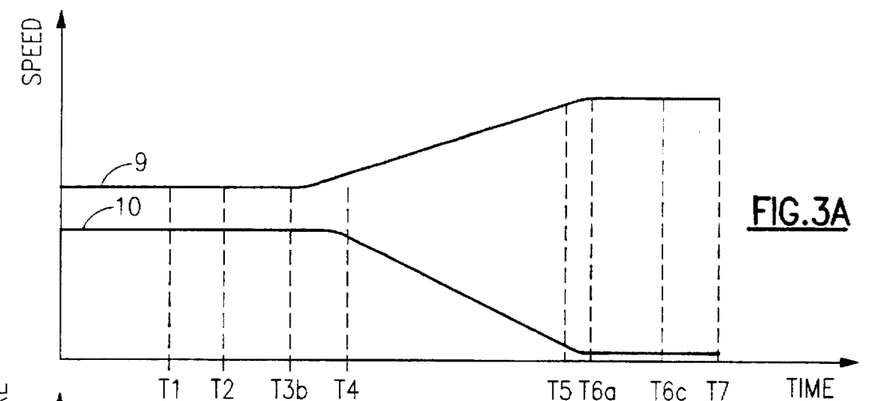
FIG. 3 is a time diagram of a gearshift of the second method.
Figure 3B:
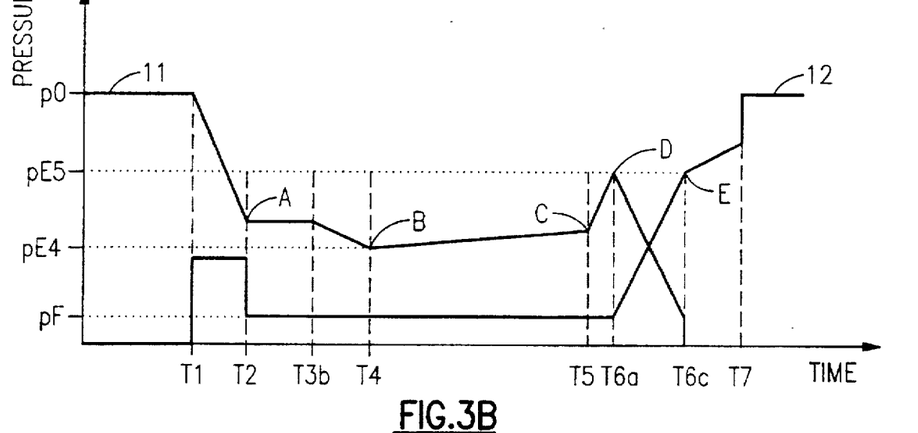
Figure 3C:
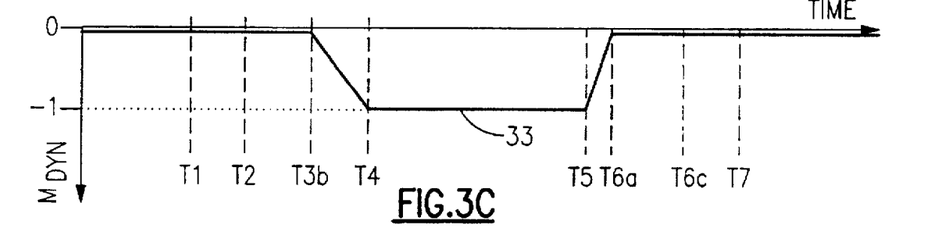
Figure 3D:
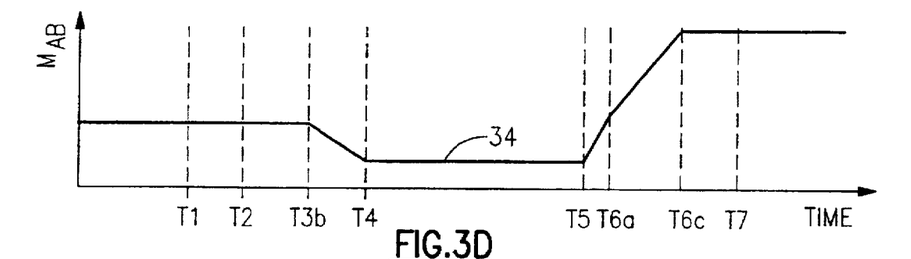

FIGS. 3A to 3D show the speed curve of the internal combustion engine 9, the differential speed 10 of the second clutch 12, the pressure curve of the first clutch 11 and the pressure curve of the second clutch 12 for a gearshift of the second method and the appertaining curves of the dynamic torque 33 (FIG. 3C) and transmission output torque 34 (FIG. 3D). A second gearshift method is to be understood as a downshift in pull load or an upshift in push load. The values of T plotted on the abscissa of FIGS. 3B and 3D correspond to the transitions of FIG. 1. With the issuance of the gearshift command, transition T1, the pressure of the first clutch is reduced from an initial level pa to a pressure level of the point A. The latter is above the slip limit of the first clutch. The second clutch is simultaneously loaded with high pressure, the rapid filling pressure. After a time interval has passed for the rapid filling pressure, transition T2 begins for the second clutch 12, the filling equalizing phase, pressure level pF, until transition T6a. The pressure of the first clutch 11 is kept constant during the filling equalizing phase. In transition T3b a time interval has elapsed for the filling equalization of the first clutch 11. Then begins the gradient setting phase of the first clutch 11. During this phase the pressure of the first clutch 11 is reduced from the pressure value point A to the pressure level of the point B, pressure value pE4. Thereby the speed curve 9 of the internal combustion engine changes in direction to higher speed values or the differential speed curve of the second clutch 12 becomes reduced. The curve of the dynamic torque 33 simultaneously diminishes from the initial value zero to the final value minus one corresponding to minus 100%. For the first clutch 11 the sliding phase begins in transition T4.

During the sliding phase the pressure of the first clutch 11 rises linearly up to the pressure level of the point C. Transition T5 has been accomplished when a presynchronization point has been reached. The definition of the presynchronization point corresponds to that from FIG. 2. In transition T5 the pressure of the first clutch 11 is raised to a final value pE5, point D. This corresponds to the gradient breakdown phase of the first clutch 11. A smoother and joltless transition to the synchronization point of the second reduction ratio is obtained by the gradient breakdown phase. During the gradient breakdown phase the dynamic torque of the first clutch 11 breaks down. If this is the case, then the transition T6a has been accomplished. With the fulfillment of this condition, the first clutch 11 is completely disengaged, that is, the pressure level goes back from point D to zero. Simultaneously begins the pressure build up of the second clutch 12 until the final value pE5, point E. This corresponds to the load take-over phase of the second clutch 12. The pressure level of the point E is a function of the static torque. Transition T6c checks whether the load take-over phase has terminated. Then begins the closure phase of the second clutch 12.

Figure 4:
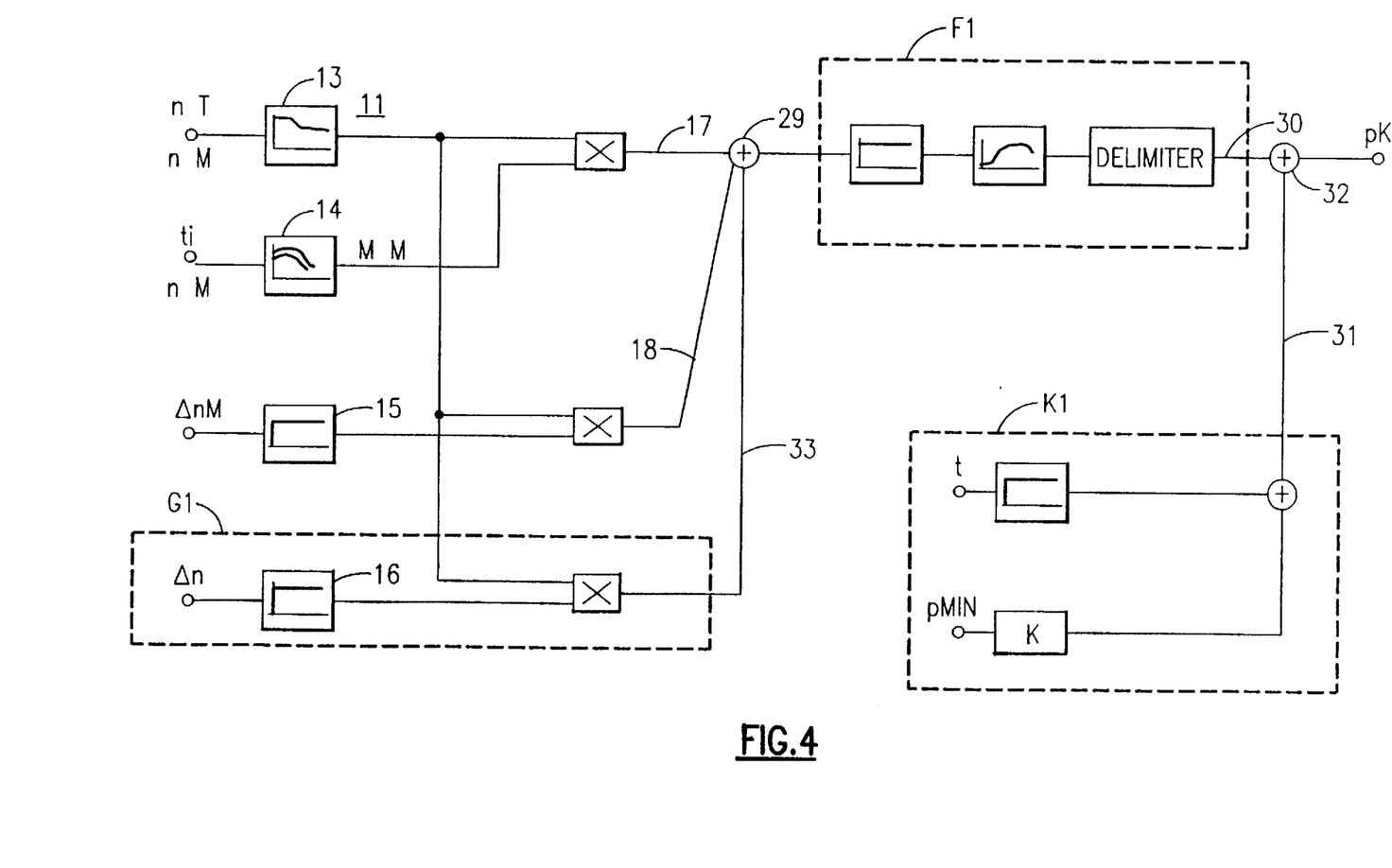
FIG. 4 is a block diagram.

FIG. 4 shows a block diagram for calculating the clutch pressure of the first clutch 11 or second clutch 12. Calculation of the clutch pressure is carried out for each clutch. The clutch pressure results from a parameter 1 which corresponds to the static torque 17, a dynamic torque 18, a factor F1 and a constant K1. In addition, FIG. 4 contains a function block G1, which, of course, is carried out only in relation to a group transmission, see FIG. 5. The static torque 17 results from the actual torque generated by an internal combustion engine and a conversion ratio. The torque actually generated by the internal combustion engine can be detected, as carried out in FIG. 4, from the two input variables speed of the internal combustion engine and injection time over a motor performance graph 14. Moreover, the motor torque here can likewise exist as genuine value. The conversion ratio, function block 13, is calculated from a speed ratio of speed of the internal combustion engine to the speed of a turbine shaft. A hydrodynamic converter is known to consist of an impeller, a turbine wheel and a stator. The speed of the impeller corresponds to the speed of the internal combustion engine. If no hydrodynamic converter is used in the automatic transmission, then the conversion ratio is established with one. The dynamic torque 18 is calculated from the conversion ratio, function block 13, multiplied by the output variables of the performance graph 15. The performance graph 15 contains a nominal shifting time, a flywheel mass based on the transmission input side and a differential speed. The differential speed, in turn, corresponds to the ratio of the first and second reductions multiplied by the transmission output speed. The flywheel mass related to the input side of the transmission is constant in transmissions of countershaft design, in planetary transmissions it depends on the gearshift. To the static torque 17 and the dynamic torque 18 are added "single" addition point 29. The sum of both torques is weighted over a factor F1. The factor F1 contains correction characteristic lines for a torque-dependent friction value, a shifting element constant and a delimiter. Output variable of the factor F1 is a pressure value 30. At the addition point 32 the pressure value 30 and the pressure value 31 are added. The pressure value 31 is output variable of a constant K1, which is formed of a minimum pressure standard and time-dependent pressure portions. Output variable of the addition point 32 is the clutch pressure pK for the corresponding clutch.

Figure 5:
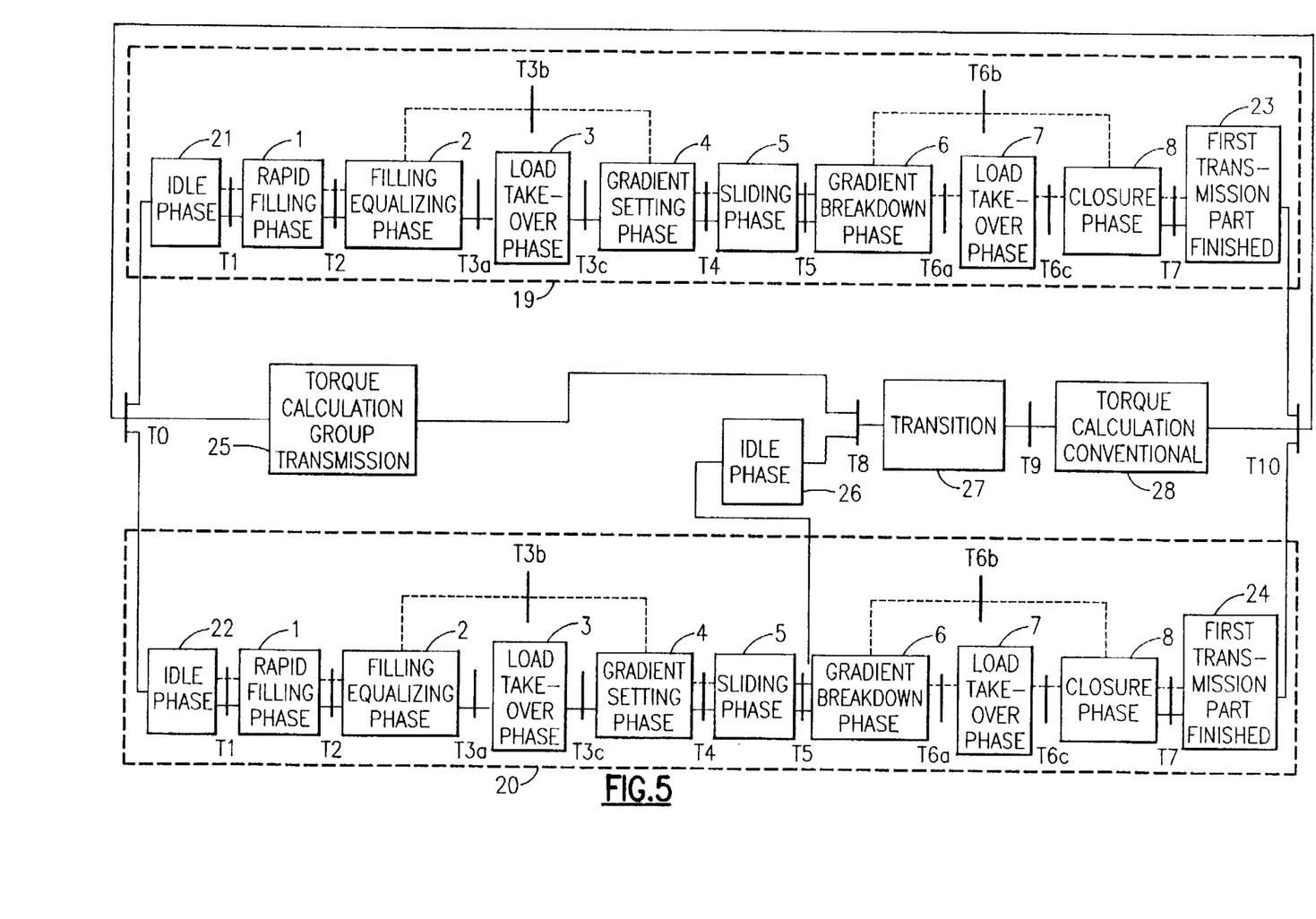
FIG. 5 is a phase diagram of a group transmission.

FIG. 5 shows a phase diagram for a group transmission. The phase diagram shows a first transmission part 19 and a second transmission part 20. In a group transmission a change from a first to a second gear speed results because the shifting directions of the individual transmission parts is opposite. If the group transmission, for example, has to carry out an upshift, then in the first transmission part an upshift takes place with great reduction step, while the second transmission part carries out a downshift with a small reduction step. In both, in the first and in the second transmission parts, the gearshifts are carried out by a first clutch disengaging and a second clutch engaging. The phase diagram shows for each transmission part a rapid filling phase 1, a filling equalizing phase 2, a load take-over phase 3, a gradient setting phase 4, a sliding phase 5, a gradient breakdown phase 6, a load take-over phase 7 and a closure phase 8. The contents of the individual phases and transitions are identical with the description of FIG. 1. As a supplement for both the first and for the second transmission parts there is added an idle phase 21 or 22 and a gearshifting end 23 completing the first transmission part and 24 the second transmission part. Likewise as supplement are added: a torque calculation group transmission 25, an idle phase 26, a transition 27 and a shifting torque calculation 28 (conventional). The idle phases 21 and 22 serve to equalize different times for the rapid filling and for the filling equalization in the first and second transmission parts. At the same time, it is possible by the two idle phases 21 and 22 to control whether in the first and second transmission parts the same phases occur simultaneously or separated by a presettable time. In the torque calculation group transmission 25, the clutch pressures of the four clutches taking part in the gear-shift are calculated. The static torque is calculated as described in FIG. 4. The parameter 2 results from the sum of the actual static torque 17, a dynamic torque 18 of the first transmission part and dynamic torque 33 of the second transmission part. The dynamic torque 18 of the first transmission part results from the differential speed of the input side of the transmission, a nominal shifting time of the internal combustion engine and a first inertia coefficient. The dynamic torque 33 of the second transmission part, in turn, results from a nominal shifting time of the second transmission part, the differential speed of the second transmission part and a second inertia coefficient. The calculation of the dynamic torque 33 of the second transmission part is shown in FIG. 4 as function block G1. The idle phase 26 begins after the presynchronization speed has appeared in the second part and terminates with the expiration of a time interval, this corresponds to the transition T8. In the transition 27 the torque calculation for the first transmission part in a presettable time is continuously carried over to the conventional torque calculation, as described in FIG. 4. In transition T9 is checked whether the time interval that controls the transition has expired. The shifting torque calculation 28 (conventional) corresponds to the torque calculation, as carried out in FIG. 4.

REFERENCE NUMERALS

| | |
|---|---|
| 1 rapid filling phase | 20 second transmission |
| 2 filling equalizing | part |
| phase | 21 idle phase |
| 3 load take-over phase | 22 idle phase |
| 4 gradient setting phase | 23 gearshift end, first |
| 5 sliding phase | transmission part |
| 6 gradient breakdown | finished |
| phase | 24 gearshift end, second |
| 7 load take-over phase | transmission part |
| 8 closure phase | finished |

-continued

| | |
|---|---|
| 9 speed internal combustion engine | 25 torque calculation group transmission |
| 10 differential speed second clutch | 26 idle phase |
| 11 first clutch | 27 transition |
| 12 second clutch | 28 shift torque calculation, conventional |
| 13 function block | |
| 14 motor performance graph | 29 addition point |
| | 30 pressure value |
| 15 performance graph | 31 pressure value |
| 16 performance graph | 32 addition point |
| 17 static torque | 33 dynamic torque |
| 18 dynamic torque | 34 transmission output torque |
| 19 first transmission part | |

We claim:

1. A process for controlling an automatic transmission driven by an internal combustion engine wherein a change from a first to a second gear speed is brought about as result of a first clutch (11) disengaging and a second clutch (12) engaging, an electronic control device controls, via more than one electromagnetic valve, a pressure curve of said first (11) and second (12) clutches during a gearshifting operation, the electronic control device selects, on the basis of input variables, one of a first or a second gearshifting method, the first gearshifting method being one of an upshift for pulling load or a downshift for pushing load and the second gearshifting method being one of a downshift for pulling load or an upshift for pushing load, the gearshifting operations comprising the steps of:

providing a rapid filling phase;

following the rapid filling phase by a filling equalizing phase;

following the filling equalizing phase by a load take-over phase;

following the load take-over phase by a gradient setting phase;

following the gradient setting phase by a sliding phase;

following the sliding phase by a gradient breakdown phase; and following the gradient breakdown phase by a closure phase;

wherein during the first gearshifting method the load take-over phase (3) is followed by the gradient setting phase (4) with the sliding phase (5), and the gradient breakdown phase (6) precedes the closure phase (8); and during the second gearshifting method the filling equalizing phase (2) is followed by the gradient setting phase (4) with the sliding phase (5) and the gradient breakdown phase (6) proceeds the load take-over phase (7).

2. A process according to claim 1, wherein the first gearshifting method, during the rapid filling phase (1), said second clutch (12) is loaded with a high pressure and the pressure of said first clutch (11) is lowered from a first to a second level, said second level here being above the slip limit of said first clutch (11), in the filling equalizing phase (2) said second clutch (12) is filled to a low pressure level (pF) and the pressure of said first clutch (11) remains on the second level, in the load take-over phase (3) the pressure of said second clutch (12) is raised to a final level (pE1=f=parameter 1) and the pressure of said first clutch (11) is lowered from the second level to zero, in the gradient setting phase (4) the pressure of said second clutch (12) is raised from the final value (pE1) to a final value (pE2=f=parameter 2), in the sliding phase (5) the pressure of said second clutch (12) is linearly raised until a presynchronization point is detected therein, in the gradient breakdown phase (6) the pressure of said second clutch (12) is reduced to a final value (pE3=f=parameter 3), where the closing phase (8) begins when the final value (pE3) is reached.

3. A process according to claim 1, wherein in the second gearshifting method, during the rapid filling phase (1), said second clutch (12) is loaded with a high pressure and the pressure of said first clutch (11) is lowered from a first to a second level, said second level here being above the slip limit of said first clutch (11), in the filling equalizing phase (2) said second clutch (12) is filled to a low pressure level (pF) and the pressure of said first clutch (11) remains on the second level, in the gradient setting phase (4) the pressure of said first clutch (11) is reduced to a final value (pE4=f=parameter 2), in the sliding phase (5) the pressure of said first clutch (11) is slopingly raised until a presynchronization point is detected therein, in the gradient breakdown phase (6) the pressure of said first clutch (11) is raised from the slope final value to a final value (pE5=f=parameter 1), in the load take-over phase (7) the pressure of said first clutch (11) is reduced from the end value (pE5) to zero and the pressure of said second clutch (12) is raised from the pressure level (pF) to the final value (pE5) and the closing phase (8) begins when the final value (pE5) is reached.

4. A process according to claim 2, wherein the final value (parameter 1) is established from a static torque (17) which is a function of an actual torque generated by the internal combustion engine multiplied by a conversion ratio when a hydrodynamic converter contained in the automatic transmission operates, the final value (parameter 2) is calculated from the sum of an actual "single" static (17) and a dynamic (18) torques, the sum is weighted with a factor (F1) and to the result is added a constant, the dynamic torque being a function of a nominal shifting time, a gyrating mass related to a transmission input side and a differential speed, which differential speed results from the ratio of the first and second gear speeds multiplied by a transmission output speed.

5. A process according to claim 4, wherein during the gradient setting phase (4) the dynamic torque (18) is raised from zero to 100%, in the sliding phase (5) the dynamic torque remains at 100%, in the gradient breakdown phase (6) the dynamic torque is reduced from 100% to zero.

6. A process according to claim 2, wherein the presynchronization point is determined from a differential speed gradient of said second clutch, the actual differential speed value of said second clutch (10) and a first time interval.

7. A process according to claim 2, wherein the parameter 3 is established by a second time interval for the transition from the differential pressure gradient at the presynchronization point to the differential speed gradient at the synchronization point, the differential speed gradient and the differential speed at the synchronization point, the differential speed gradient and the differential speed at the synchronization point being zero.

8. A process according to claim 1, wherein within the closing, phase (8) the pressure on said second clutch (12) is slopingly raised until the absolute value of the differential speed of said second clutch (10) within a third time interval is less than a nominal value and said second clutch (12) is then loaded with the main pressure.

9. A process according to claim 1, wherein a push-pull difference results on the basis of the sign of the sum of actual static (17) and actual dynamic (18) torques.

10. A process according to claim 1, wherein during an upshift in pull load during the sliding phase a motor engagement is carried out.

11. A process according to claim 1, wherein during the sliding phase, when calculating the parameter (2), a deviation from nominal to actual shifting curve is corrected by a factor (F1).

12. A process according to claim 1, where a group transmission is applied to the process.

13. A process for controlling an automatic transmission in a group design driven by an internal combustion engine wherein a change from a first to a second gear speed is achieved by shifting devices in first (19) and a second (20) transmission parts working in opposite directions, said first transmission part having a large ratio range and said second transmission part a small ratio range, and, in each transmission part, a first clutch (11) disengages and a second clutch (12) engages, an electronic control device controlling during a gearshift operation, via more than one electromagnetic valve, a start of the gearshift operation and a pressure curve of said first (11) and second (12) clutches of said first (19) and second (20) transmission parts, said electronic control device selecting, on the basis of input variables, one of a first or a second gearshifting method, the first gearshifting method being an upshift for pulling load or a downshift for pushing load and said second gearshifting method being one of a downshift for pulling load or an upshift for pushing load, the automatic transmission being simultaneously shifted in the first and second transmission parts, the gearshifting operations comprising the steps of:

provinding a rapid filling phase;

following the rapid filling phase by a filling equalizing phase;

following the filling equalizing phase by a load take-over phase;

following-the load take-over phase by a gradient setting phase;

following the gradient setting phase by a sliding phase;

following the sliding phase by a gradient breakdown phase; and following the gradient breakdown phase by a closure phase;

wherein during the first gearshifting method the load take-over phase (3) is followed by the gradient setting phase (4) with the sliding phase (5), and the gradient breakdown phase (6) precedes the closure phase (8); and during the second gearshifting method the filling equalizing phase (2) is followed by the gradient setting phase (4) with the sliding phase (5) and the gradient breakdown phase (6) proceeds the load take-over phase (7).

14. A process according to claim 13, wherein a parameter (2) results from a single sum of an actual static torque (17), a dynamic torque (18) of the first transmission part resulting from a differential speed on a transmission input side, a nominal shifting time of the internal combustion engine and a first inertia coefficient, and a dynamic torque (33) of the second transmission part resulting from the differential speed of the second transmission part, a nominal shifting time of said second transmission part and a second inertia coefficient.

15. A process according to claim 14, wherein with detection of the presynchronization point in said second transmission part (20), the calculation of the parameter (2) passes over into the calculation of the parameter (2) in accordance to said first transmission part (19).

* * * * *